(No Model.)

G. M. NEWHALL.
SUGAR DISSOLVING APPARATUS.

No. 535,720. Patented Mar. 12, 1895.

WITNESSES
Will A. Barr.
Frank Bechtold

INVENTOR
George M. Newhall
By his Attorneys
Howson & Howson

UNITED STATES PATENT OFFICE.

GEORGE M. NEWHALL, OF PHILADELPHIA, PENNSYLVANIA.

SUGAR-DISSOLVING APPARATUS.

SPECIFICATION forming part of Letters Patent No. 535,720, dated March 12, 1895.

Application filed May 14, 1894. Serial No. 511,152. (No model.)

*To all whom it may concern:*

Be it known that I, GEORGE M. NEWHALL, a citizen of the United States, residing in Philadelphia, Pennsylvania, have invented certain Improvements in Sugar-Dissolving Apparatus, of which the following is a specification.

My invention relates to improvements in sugar dissolving pans and the object of my invention is, first, to increase the filtering surface by making the cylindrical sides of the basket perforated, and second to make such perforations smaller so that a finer screening is obtained; third, by revolving the basket and having stationary paddles which prevent the sediment from settling or impeding the free or perfect exit of the clear liquid through the perforations, thus increasing the effectiveness of the filter and capacity of the pan and also saving considerable time in cleaning.

Figure 1:
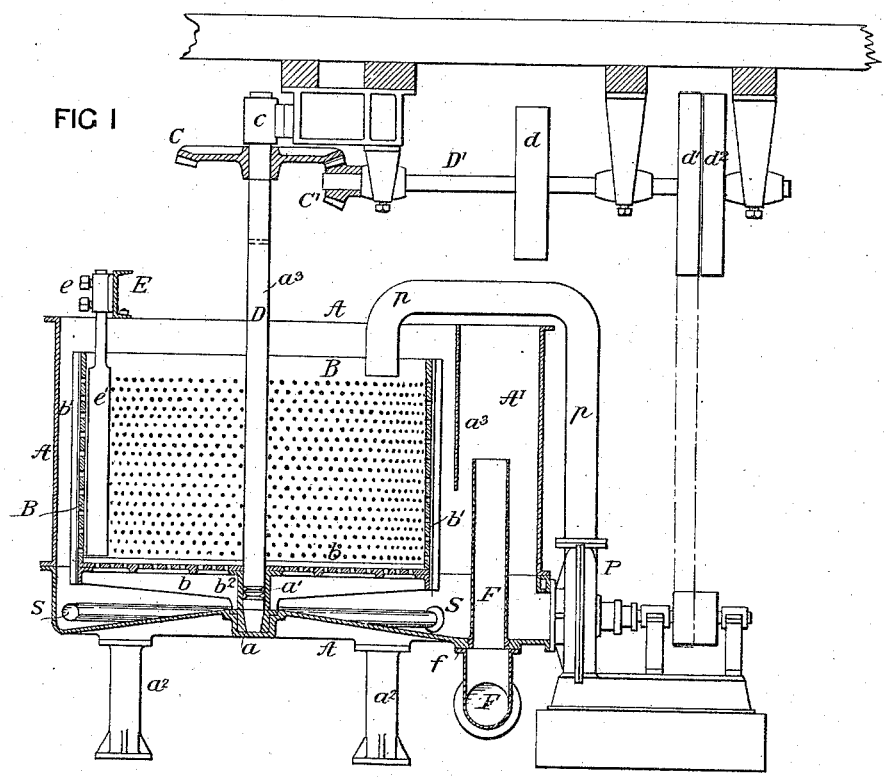
Figure 2:
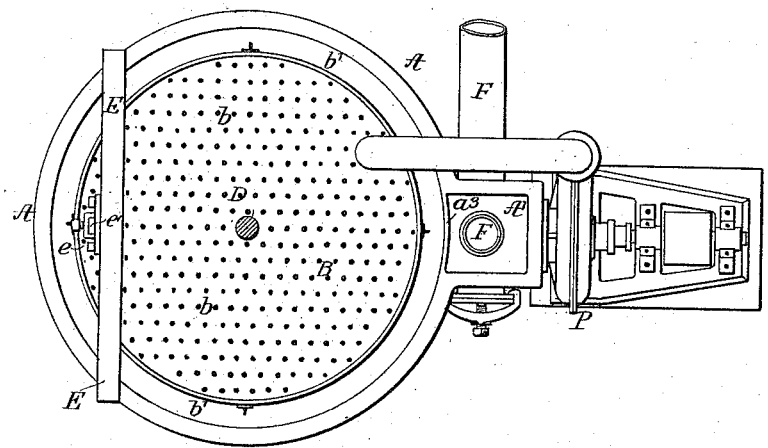

In the accompanying drawings:—Figure 1, is a sectional elevation of my improved dissolving pan. Fig. 2, is a plan view of the dissolving pan with the overhead pulleys and shafting removed.

A is a casing which is preferably made in two parts, as shown. The bottom part of said casing is mounted upon legs or supports $a^2$, $a^2$ and is provided with a step bearing $a$ into which a short spindle extends. Mounted upon this spindle is a friction disk $a'$ and resting on this disk is a vertical shaft D. Secured to the shaft D is a basket B having a perforated bottom $b$ and perforated sides $b'$. A collar $b^2$ extending from the bottom forms a casing for the bearing of the end of the vertical shaft D. The shaft D is adapted to a bearing $c$ at its upper end and is geared to a driving shaft D' by bevel wheels C C'. The shaft D' is mounted in suitable hangers secured to the stringers attached to the floor beams of the floor above. Mounted on the shaft D' is a driving pulley $d$.

E is a beam bolted to the curb or top flange of the casing A to which a bracket $e$ is secured, in which a paddle $e'$ is vertically adjustable, being secured in its adjusted position by set screws. Said paddle $e'$ extends into the basket B in close proximity to the cylindrical perforated sides $b'$ and thus serves, when the basket is revolved, to remove or stir the sediment or undissolved lumps of raw sugar, thus preventing them from impeding the free passage of the clear liquid through the perforations.

The casing A is provided with an extension or well A' separated therefrom at the top by a partition $a^3$. The bottom of said well is provided with a seat $f$. In this seat rests a pipe F which extends upward above the bottom edge of the portion $a^3$ and thus closes the bottom of the casing A.

A centrifugal pump P is connected to the well A' as shown, and is driven by means of a belt from a pulley $d'$ on the shaft D'. $d^2$ is a loose pulley on the said shaft D' onto which the belt may be shifted if it is desired not to use the pump.

S is a steam pipe in the bottom of the casing A which serves to heat the liquid and prevent it from settling. This steam pipe may be perforated.

The operation of the apparatus is as follows:—The water or liquor level in the pan being maintained about on a line with the upper perforations in the revolving basket B, the raw sugar in a divided state along with fresh water is continuously fed into the basket. By the agitation and thorough mixing and circulation through the pump P the solution of the sugar is quickly made at a low temperature and a liquid of uniform density quite free from undissolved crystals is drawn off continuously through the overflow pipe F. To empty the melting vessel the overflow pipe at the end of the day's work is raised from its seat and the contents flow through the horizontal pipe F to pump or to tanks.

I claim as my invention—

1. The combination in a dissolving apparatus, of the casing, a perforated basket within the casing and into which the raw material is discharged, means for revolving said basket, an outlet for the casing above the bottom of the basket whereby liquid will be maintained at a level both in the casing and basket, with a circulating pump communicating with the bottom of the casing, and a pipe leading from the pump to a point above the basket so that the material will be circulated in the basket and casing, substantially as described.

2. The combination of the casing, the well communicating therewith, a removable overflow pipe in said well through which the liquor is discharged, a vertical shaft mounted in said casing, a basket secured to said shaft and having perforated sides and bottom, with a paddle extending into the basket adjacent to one side so that as the basket is revolved the paddle will prevent sediment from settling or impeding the free exit of clear liquor through the perforations, substantially as described.

3. The combination of the casing, with a rotary basket having perforated sides forming a filtering surface, a well separated from the basket by a partition at the upper portion and communicating with the casing at the bottom, a pump communicating with the bottom of the well and a pipe leading from the pump to a point above the basket, with an overflow pipe from the well extending above the bottom of the basket whereby a level of liquid will be maintained in both the casing and basket, substantially as described.

In testimony whereof I have signed my name to this specification in the presence of two subscribing witnesses.

GEORGE M. NEWHALL.

Witnesses:
WILL. A. BARR,
JOSEPH H. KLEIN.